Jan. 22, 1963
A. S. ECKHARDT
3,074,677
WIRE SUPPORT AND BLANK
Filed Nov. 20, 1958
2 Sheets-Sheet 2
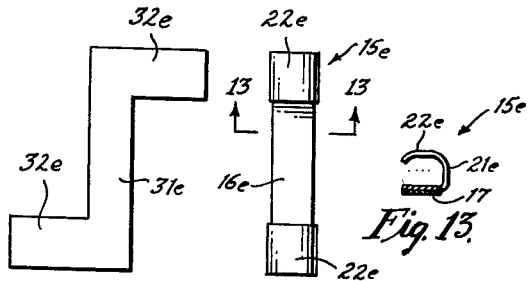
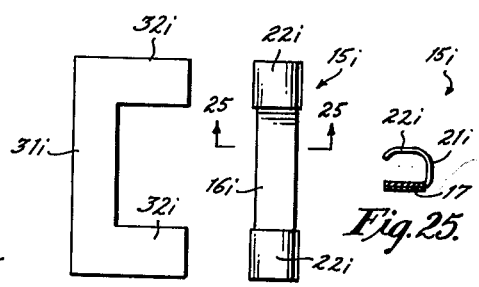
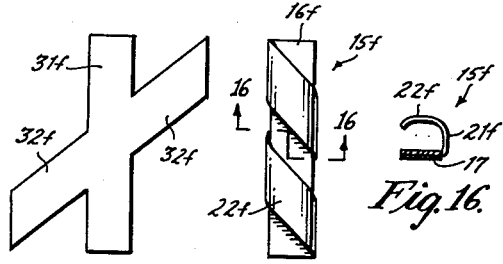
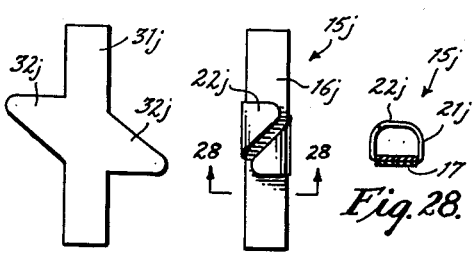
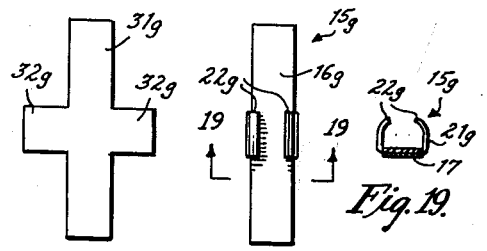
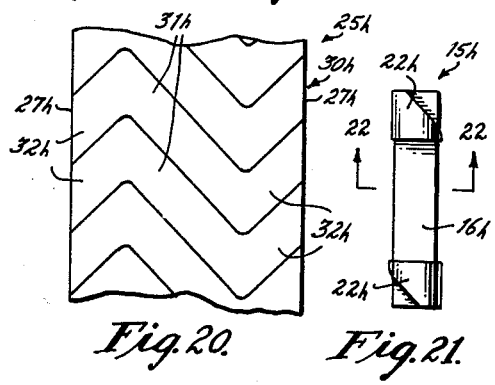
INVENTOR.
ADRIAN S. ECKHARDT
BY
ATTORNEY United States Patent Office 3,074,677
Patented Jan. 22, 1963

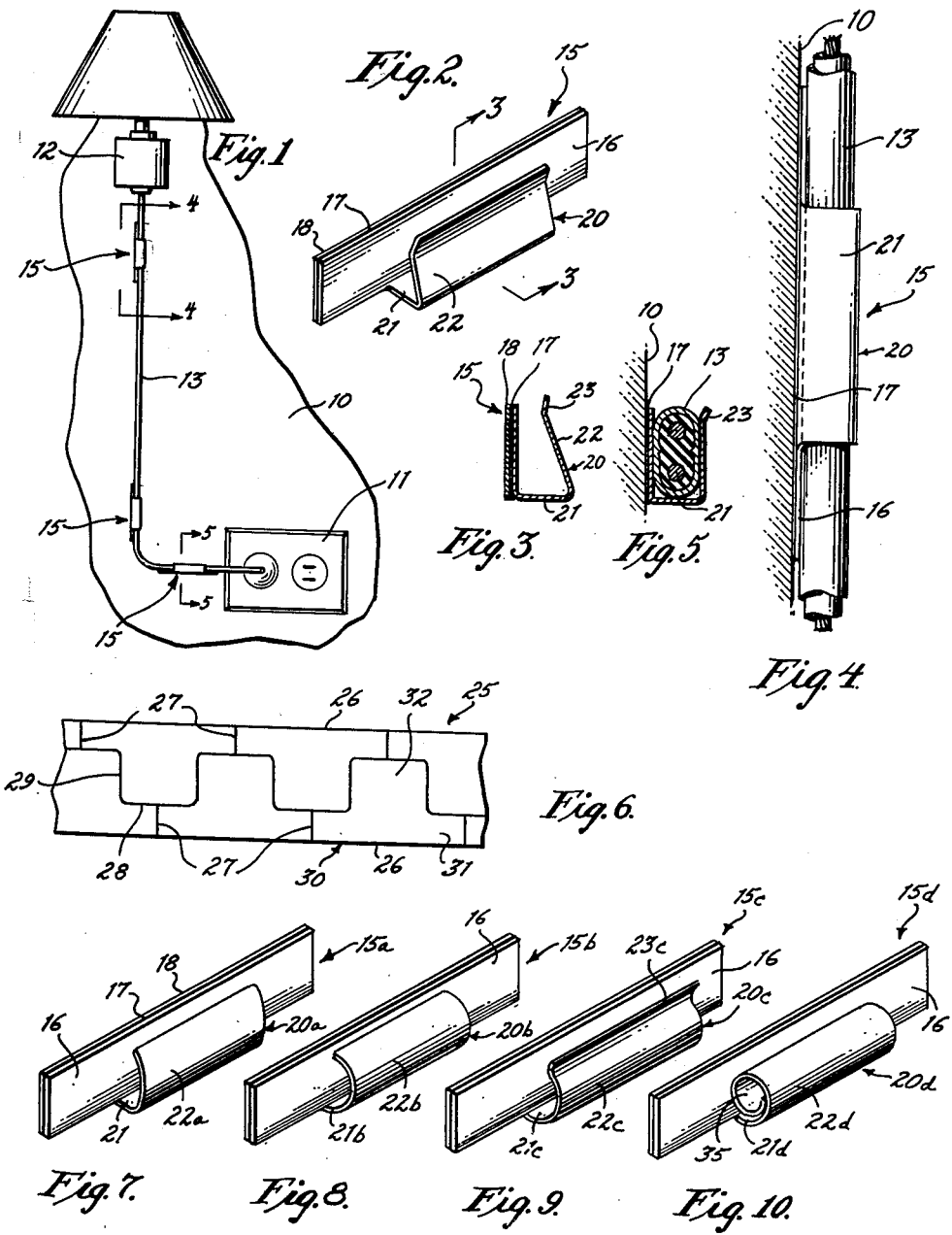

3,074,677
WIRE SUPPORT AND BLANK
Adrian S. Eckhardt, Pennsauken, N.J. (% Mr. Francis A. Wodal, Wing Corp., 620 Viola St., Camden 4, N.J.)
Filed Nov. 20, 1958, Ser. No. 775,140
5 Claims. (Cl. 248—74)

This invention relates generally to a device for supporting wire when in use, and a blank from which the instant device may be made.

As is well known to those versed in the art, the supporting of wires, as in domestic, commercial and industrial wiring, usually requires a type of supporting element necessarily affixed to a wall or other object in a manner which defaces the wall or object, such as by the impaling points of a staple or the fastening screw of a strap type support. Thus, in addition to the labor involved in installing wires with conventional wire supports, such supports are objectionable by reason of the labor involved in their removal and damage caused to supporting walls and the like.

Similarly, the wiring of electrical and electronic products with conventional wire supporting elements is subject to serious difficulties. For example, in many wired products it is necessary to manually tie a group of wires together at spaced intervals and additionally fasten the tied wires to a chassis or housing. Obviously, this procedure does not lend itself to economies of mass production.

Accordingly, it is one object of the present invention to provide a wire supporting device which is adapted to securely hold a wire or wires in desired position against the forces of shock, vibration and normal usage, which may be quickly and easily removed from its original position, and replaced at another position, if desired, all without damage to the supporting wall or object. More specifically, the present invention contemplates the provision of a wire supporting clip or element which effectively performs its supporting function without the use of nails, screws or other fastener devices likely to damage a wall surface.

It is a further object of the present invention to provide a wire supporting element having the advantageous characteristics mentioned in the preceding paragraph which is inconspicuous in use, so that it may be advantageously employed in domestic interiors and the like without adversely affecting the aesthetic effect thereof.

It is still another object of the present invention to provide a wire supporting element of the type described which is extremely versatile in use and well adapted to fasten wires along most any type of surface.

It is still a further object of the present invention to provide a wire supporting element and blank therefore which are extremely simple in construction and durable in use, and which are capable of economic mass production for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a partial elevational view showing a wall having a lamp affixed thereto and having its electric supply cord carried by the wall employing wire fasteners of the present invention;

FIGURE 2 is an enlarged perspective view showing a wire supporting element constructed in accordance with the teachings of the instant invention;

FIGURE 3 is a transverse sectional view taken substantially along the line 3—3 of FIGURE 2;

FIGURE 4 is a sectional view, enlarged for clarity of detail, taken substantially along the line 4—4 of FIGURE 1;

FIGURE 5 is a sectional view, also enlarged, taken substantially along the line 5—5 of FIGURE 1;

FIGURE 6 is a plan view illustrating the manufacture of blanks adapted to be formed into wire supporting elements of FIGURES 1-5;

FIGURE 7 is a perspective view showing a slightly modified form of wire-supporting element of the present invention;

FIGURE 8 is a perspective view showing another slightly modified form of wire-supporting element of the present invention;

FIGURE 9 is a perspective view showing a slightly modified form of wire-supporting element of the present invention;

FIGURE 10 is a perspective view showing yet a further embodiment of wire-supporting element of the present invention;

FIGURE 11 is a plan view showing a blank of another embodiment of the present invention;

FIGURE 12 is a plan view showing the finished wire support formed from the blank of FIGURE 11;

FIGURE 13 is a transverse sectional view taken substantially along the line 13—13 of FIGURE 12;

FIGURE 14 is a plan view showing a blank of a further modification of the instant invention;

FIGURE 15 is a plan view showing the completed wire support formed from the blank of FIGURE 14;

FIGURE 16 is a transverse sectional view taken substantially along the line 16—16 of FIGURE 15;

FIGURE 17 is a blank showing still a further embodiment of the present invention;

FIGURE 18 is a plan view showing a finished wire support fabricated from the blank of FIGURE 17;

FIGURE 19 is a transverse sectional view taken substantially along the line 19—19 of FIGURE 18;

FIGURE 20 is a plan view showing a plurality of blanks in accordance with additional teachings of the present invention;

FIGURE 21 is a plan view showing a wire support fabricated from a blank of FIGURE 20;

FIGURE 22 is a transverse sectional view taken substantially along the line 22—22 of FIGURE 21;

FIGURE 23 is a plan view showing a blank for still another embodiment of the present invention;

FIGURE 24 is a plan view showing a finished wire support formed from the blank of FIGURE 23;

FIGURE 25 is a transverse sectional view taken substantially along the line 25—25 of FIGURE 24;

FIGURE 26 is a plan view showing a slightly modified blank of the present invention;

FIGURE 27 is a plan view showing a wire support formed from the blank of FIGURE 26; and FIGURE 28 is a transverse sectional view taken substantially along the line 28—28 of FIGURE 27.

Referring now more particularly to the drawings, and specifically to FIGURE 1 thereof, a supporting wall surface is there designated 10, in which is located an electrical outlet 11. A lamp 12 is illustrated as fixed to the wall 10; and, an electric wire or cord 13 extends from the lamp 12 to the outlet or receptacle 11 being supported and secured to the wall 10 by a plurality of supporting elements 15.

One of the elements 15, before its securement to a wall or other supporting surface, is illustrated in enlarged detail in FIGURES 2 and 3. It will there be seen that the wire-supporting element 15 includes an elongate, generally rectangular, substantially flat back plate 16. On one surface of the back plate 16, the back surface as seen in FIGURE 2, there is provided a coating or layer of pressure-sensitive adhesive 17 which extends substantially entirely over the back surface of the back plate. Secured on the exterior or rearward surface of the adhesive layer 17 is a flexible protective sheet 18, of paper or other suitable material, which substantially completely covers the adhesive layer 17 to protect the layer before use, and which is manually removable as by stripping from the adhesive coating to expose the latter for securement to a supporting surface.

Medially of the longitudinal extent of back plate 16 and preferably formed integrally with the latter is an outstanding receiver element 20. That is, the receiver element 20 is located approximately equally spaced distances from both ends of the back plate 16 and projects forward therefrom or outward from the forward face of the back plate. The receiver 20 includes a generally flat outstanding portion or element 21 of approximately rectangular configuration projecting forward or outward from the medial region of one longitudinal edge of the back plate 16 approximately normal to the back plate. From the outer or forward edge portion of the outstanding element 21 extends a facing element 22 into facing spaced relation with respect to the forward face of the back plate 16. The facing element 22 may be a generally rectangular sheet-like extension integral with the outstanding element 21 and coextensive therewith longitudinally of the back plate. As best seen in FIGURE 3, the facing element 22 extends from the outer or forward region of the outstanding element 21 obliquely toward the back plate 16 and terminates adjacent to but spaced forward from the upper longitudinal edge of the back plate in an outwardly bent upper edge portion 23.

The back plate 16, and the receiver 21, 22 and 23 are advantageously formed from a single sheet of stiff, resilient and insulating material, such as plastic, or other suitable material. From its non-use condition of FIGURES 2 and 3, the facing element 22 of the wire supporting element 15 is resiliently deflectable toward or away from the back plate 16 by reason of the resilient character of the sheet material from which it is formed. Where the support is mounted prior to insertion of a wire, pressure is applied to the exposed portions of the back plate and to the clip or facing element 22. In doing so, the free edge of the facing element 22 will be urged into contact with the back plate to transmit pressure thereto as well as through the bottom connecting portion 21. But upon release of the applied pressure, the facing element will spring back to its non-use condition for reception of a wire.

In its condition of use, see FIGURES 4 and 5, the facing element 22 has been resiliently deflected outward away from the back plate 16 to receive an electric wire or cord 13 in the space between the facing element 22, outstanding element 21 and back plate 16, the wire being resiliently embraced in its received condition by the resiliency of the receiver 20. Also, the flexible protective sheet 18 has been stripped from the adhesive layer 17 and the latter pressed against a supporting surface 10 of any suitable object to adhesively secure the wire supporting element and its received wire portion in position relative to the supporting object.

The insertion of wire 13 into the receiver 20 is facilitated by the outwardly bent free end edge portion 23 of the receiver, the latter affording a lip for manually retracting the facing element 22 away from the back plate 16 and serving also to guide the wire into the received position. It will be noted in the horizontal wire position of FIGURE 5, the force against the wire supporting element 15 is substantially vertically downward, and through the lower longitudinal edge region of the back plate 16, so that the adhesive layer is substantially completely in sheer and therefore highly effective in securing the supporting element fast to the wall surface. Also, as best seen in the vertical wire position of FIGURE 4, a force tending to pull the wire outward away from the wall surface 10 is applied through the receiver 20 to a portion of the back plate 16 spaced from the end edges thereof. This force applied to a medial region of the back plate, rather than an end edge region, is effectively resisted by a suction action between the wall surface 10 and the back plate in facing conforming engagement with the wall surface.

FIGURE 6 illustrates a stage in the manufacture of supporting elements 15, the latter being formed from an elongate strip 25 of stiff resilient material, preferably plastic or other suitable insulating material. The strip is defined between longitudinal edges 26 and die cut or otherwise severed to define a plurality of cuts or severance lines 27 extending inward from each longitudinal edge 26 at spaced locations therealong. Further, the severance lines or cuts 27 along one longitudinal strip edge 26 are located in alternate or staggered relation with respect to the cuts 27 along the other longitudinal edge; and, the cuts 27 along each longitudinal edge extend laterally inward from the respective edge and terminate short of the cuts extending inward from the other longitudinal edge. Further, a severance line or cut 28 is formed in the strip 25 extending longitudinally thereof and intersecting at its midpoint with the laterally inward termination of each cut or severance 27. Thus, the cuts or severance lines 28 intersecting with the inner ends of the cuts 27 along each side 26 are in longitudinal alignment with each other, extending adjacent to and spaced inward from the longitudinal edge 26 intersecting with the associated cuts 27. Further, all the cuts 28 are of equal length, one longitudinally aligned group being spaced laterally of the strip 25 from the other longitudinally aligned group, and the cuts 28 of one group being arranged in alternate relation with respect to the cuts 28 of the other group longitudinally of the strip. As the cuts 28 are all of the same length with each adjacent aligned pair of cuts 28 being spaced a distance approximately equal to one cut length, and as the cuts 28 of one aligned group are in a symmetrically staggered relation with respect to the cuts 28 of the other aligned group, it follows that the cuts 28 of each aligned group are spaced laterally opposite from the spaces between the cuts 28 of the other aligned group. Viewed otherwise, the ends of each longitudinally extending cut 28 are located directly laterally opposite to the ends of an adjacent pair of cuts 28 of the other longitudinally aligned group. Extending between each laterally opposed pair of ends of cuts 28 is a laterally extending cut 29. Thus, the longitudinally extending medial region of the strip 25 is formed with a plurality of generally parallel laterally extending cuts or severance lines 29 spaced from each other longitudinally of the strip, and each extending between an adjacent laterally opposed pair of ends of cuts 28 of respective longitudinally aligned groups of the latter cuts.

It will now be apparent that the cuts 27, 28 and 29 formed in the strip 25 define a plurality of substantially identical blanks, each generally designated 30, including an elongate generally rectangular main portion 31, and a generally rectangular minor portion 32 extending laterally from one side of the main portion spaced medially between the ends thereof. More particularly, each main portion 31 is defined within a longitudinal edge 26, adjacent pair of transverse cuts 27, and longitudinally aligned cuts 28, while each minor portion 32 is defined between an adjacent pair of transverse cuts 29, a single longitudinal cut 28 of one longitudinally aligned group of such cuts, and the line of alignment of the other longitudinally aligned group of cuts 28.

Further, it will now be apparent that each elongate main portion 31 is of a length approximately double that of each minor portion 32 longitudinally of the strip 25, and that each minor portion is located medially between the ends of the associated major portion.

In order to complete the supporting element 15 from a blank 30, it is only necessary to adhesively coat one surface of the major portion 31, and form the minor portion 32, by bending, into the receiver 20.

Referring now to the embodiment of FIGURE 7, the wire supporting element thereof, generally designated 15a, includes a generally rectangular, elongate back plate 16 substantially identical to that of the first described embodiment, and a receiver element 20a for receiving wire to be supported. The receiver element 20a includes an outstanding element 21 substantially identical to the element 21 of FIGURES 1-5, projecting normal to and outward from the medial lower edge region of the back plate 16. A facing element 22a extends integral with and upward from the outer edge region of the outstanding element 21 in facing spaced relation with the forward surface of the back plate. The facing element 22a is of an arcuate contour in a cross section transverse of the longitudinal extent of the back plate, being concave on its rearward or inward side facing toward the back plate. The arcuate transverse cross sectional configuration of the facing element 22a may be advantageous in the supporting of certain shapes of wire or a group of wires. In the embodiment of FIGURE 8, the wire supporting element is generally designated 15b and includes a back plate 16 which may be substantially identical to the back plate of FIGURES 1-5. A receiver element 20b is provided medially of the back plate 16 in the embodiment of FIGURE 8 and extends from the lower longitudinal edge thereof generally upward defining in transverse cross section a continuous substantially semi-circular arc. Thus, the receiver 20b may be considered as having outstanding and facing elements 21b and 22b lying in a continuous semi-circular arc with the upper free edge of the facing element terminating adjacent to the upper longitudinal edge of the back plate. This embodiment of wire supporting element may be advantageous for use in conjunction with wire of generally circular cross section, or bundles of wires.

A further embodiment of wire supporting elements, generally designated 15c, is illustrated in FIGURE 9, which includes a back plate 16 substantially the same as that of FIGURES 1-5, and a receiver element 20c extending outward from the medial region of the lower longitudinal edge of the back plate. The receiver element 20c includes a generally horizontal outstanding element 21c, from the outer edge of which extends an upstanding element 22c of generally arcuate configuration in cross section and having its concave side facing rearward toward the back plate 16. The upper or free edge portion 23c of the upstanding element 22c, extending longitudinally of the back plate 16, is bent to extend obliquely upward and outward away from the back plate. This embodiment may be advantageously employed where it is desirable to support a round conductor or plurality of conductors and facilitate their insertion into the receiver 20b by the oblique lip 23c.

In FIGURE 10 is shown still a further embodiment of the present invention, the wire supporting element there being generally designated 15d, and including a generally rectangular flat back plate 16 which may be identical to that of FIGURES 1-5. The receiver 20d is located equally spaced from opposite ends of the back plate, extending from a medial region of one longitudinal edge of the back plate into position in front of the back plate. In particular, the receiver 20d includes an outstanding element 21d extending forward from the lower medial edge region of the back plate, an upstanding element or portion 22d extending upward from the outer region of the outstanding element, and a receiver extension 35 extending from the upper region of the upstanding element 22d toward the back plate 16, downward, thence forward over the outstanding element 21d, and thence upward rearward of the upstanding element 22d. More specifically, the outstanding element 21d, upstanding element 22d, and extension 35 are preferably all integrally formed of a single sheet, being coextensive with each other longitudinally of the back plate 16, and combining to define a helically coiled or curled strip. The receiver 20d, by reason of its resilience, is uncoilable to receive a wire or group of wires, and releasable to recoil about the received wire or wires by its own resilience. Thus, the wire supporting element 15d may be advantageously employed both as means for securing a plurality of wires together, and for supporting the same with respect to a supporting surface or object.

Of course, each of the back plates 16 of FIGURES 7-10, inclusive, may be provided on their rear surfaces with pressure sensitive adhesive, as desired, for securing the wire-supporting elements to a supporting surface or object. Also, it is believed apparent that each of the embodiments of FIGURES 7-10, inclusive, may be formed from a blank 30 of FIGURE 6, and of course the dimensions and proportions thereof may be varied, if required.

The blank of FIGURE 11, which may be die-cut or otherwise formed of an integral sheet of stiff, resilient material, includes an elongate, generally rectangular main portion 31e, and a pair of additional portions 32e extending laterally outward from opposite side edges of the main portion, adjacent to opposite ends thereof. The additional or minor portions 32e are also of generally rectangular configuration, and extend generally normal to the longitudinal direction of the main portion 31e. The wire support 15e of FIGURES 12 and 13 is formed from the blank of FIGURE 11 by bending the minor blank portions 32e into facing spaced relation with the adjacent portions of the major blank portion 31e. More particularly, the elongate portion 31e defines a generally rectangular, elongate back plate 16e in the finished support, while the minor portions 32e are each bent to define an outstanding element 21e projecting generally outward from the back plate along one longitudinal edge portion thereof, and a facing element 22e extending from the outer end of the outstanding element 21e into facing spaced relation with the adjacent portion of the back plate. On the rearward surface of the back plate 16e, facing away from the facing elements 22e, may be provided suitable securing material, adhesive 17, or the like.

The blank of FIGURE 14 includes an elongate, generally rectangular main portion 31f, and a pair of auxiliary or minor portions 32f extending outward from opposite longitudinal side edges of the main portion, all being integrally formed of suitable sheet material. In this embodiment, the minor portions 32f extend integrally from respective side edges of the main portion 31f at regions intermediate the ends of the latter portion, and extend oppositely outward generally oblique to the longitudinal direction of the main portion. More specifically, the minor portions 32f extend in opposite directions obliquely outward from their intermediate regions of the main portion 31f, in substantial alignment with each other, and each terminates in substantial lateral alignment with the adjacent end of the main portion.

The support 15f of FIGURES 15 and 16 is formed from the blank of FIGURE 14 by bending the minor portions 32f into facing, spaced, overlying relation with respect to the main portion 31f. The main portion thus becomes an elongate back plate 16f, while each minor portion defines an outstanding element 21f projecting forward from the outer surface of the back plate, and a facing element 22f extending from the outer end of the outstanding element to spacedly overlie the back plate. By the oblique direction of the minor portions 32f, the facing portions 22f are caused to extend obliquely across the back plate 16f in their facing spaced relation with respect to the latter. Of course, suitable securing means 17 may be provided on the inner surface of the back plate.

By this construction, a wire support 15f may be placed on a wire with the latter extending through the space between the pair of facing elements 22f, and the support twisted to simultaneously engage the wire beneath both of the facing elements.

The blank of FIGURE 17 includes a main, generally rectangular elongate portion 31g, and extending laterally, oppositely outward therefrom and integral therewith are a pair of generally rectangular minor portions 32g. The mino portions are located spaced intermediate the ends of the major portion, and extend generally normal to the latter.

In its finished form, see FIGURES 18 and 19, the blank of FIGURE 17 has its laterally extending minor portions 32g bent outward, each including an outstanding element 21g projecting outward from the flat, generally rectangular base plate 16g, and a facing element 22g extending from the outer end of the outstanding element into facing spaced relation with respect to the base plate. Thus, the outstanding elements 21g are in laterally spaced, facing relation with respect to each other, and the facing elements 22g extend toward and terminate short of each other. In use, wire is engaged between the base plate 16g and facing elements 22g and held by the latter.

In FIGURE 20 is illustrated a strip 25h of sheet material, from which are formed a plurality of blanks 30h. Each of the blanks includes an elongate, generally rectangular main portion 31h disposed obliquely of the strip 25h from which the blanks are cut, and a pair of minor portions 32h extending laterally outward from opposite sides of the major portion adjacent to opposite ends thereof and generally normal thereto. Thus, the end portions 32h are also disposed oblique with respect to the longitudinal extent of the strip 25, and terminate at respective side edges 27h of the strip along which edges the minor portions taper toward their free ends.

The wire support 15h of FIGURES 21 and 22 is formed from a blank 30h and includes a generally rectangular elongate base plate 16h, a pair of outstanding elements 21h projecting outward from opposite sides of the base plate adjacent to opposite ends thereof, and a facing element 22h extending from the outer end of each outstanding element in facing spaced relation with respect to the base plate. The facing elements 22h are each of generally triangular configuration, as best seen in FIGURE 21, tapering in the direction away from the adjacent outstanding element 21h to define a right triangle each having its hypotenuse facing obliquely away from the hypotenuse of the other.

In the embodiment of blank illustrated in FIGURE 23, an elongate, generally rectangular main blank portion 31i is provided with a pair of laterally outwardly projecting minor portions 32i on the same longitudinal side of the elongate portion and adjacent to opposite ends thereof.

In the completed form, see FIGURES 24 and 25, the wire support 15i includes a generally rectangular base plate 16i, a pair of spaced, oustanding elements 21i located on the same side of the base plate and adjacent to opposite ends thereof, and a pair of facing elements 22i each extending from the outer end of a respective outstanding element into facing spaced relation with respect to the base plate 16i.

Wire is engageable beneath the facing elements 22i, seated on the base plate 16i, and the latter is adapted to be secured by suitable means 17 to an appropriate supporting surface, to support the received wire.

The blank of FIGURE 26 includes a generally rectangular, elongate main portion 31j, and a pair of laterally oppositely outwardly projecting minor portions 32j. The minor portions 32j extend laterally outward from opposite sides of the main portion 31j, spaced intermediate the ends of the latter, and may be offset from each other longitudinally of the main portion for a purpose appearing presently.

In the finished form of the blank of FIGURE 26, a wire support 15j, as in FIGURES 27 and 28, includes a base plate 16j defined by the major blank portion 31j, and each of the minor portions 32j provides an outstanding element 21j projecting outward from the base plate, and a facing element 22j extending from the outer end of the outstanding element in spaced overlying relation with the base plate. As best seen in FIGURE 27, the facing elements 22j may be disposed in side-by-side relation overlying an intermediate region of the base plate 16j.

In the embodiment of FIGURES 26–28, it may be advantageous to fabricate the integral blank of a deformable, nonresilient sheet material, to facilitate manual swinging deformtion of the facing elements 22j into and out of overlying embracing engagement with wire seated on the base plate 16j.

Although the heretofore described embodiments of FIGURES 1–25 are advantageously fabricated of a resiliently deflectable sheet material, these embodiments may also be formed of a nonresilient deformable material and their facing elements deformably deflected into embracing engagement with supported wire, if desired. It is also appreciated that these embodiments of the instant invention may be formed otherwise, say of cardboard or fibrous material, metal, plastic-coated metal, or may be molded of plastic, if desired.

From the foregoing it is seen that the present invention provides a wire-supporting element and blank for manufacturing the same which fully accomplish their intended objects, and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A wire support formed of relatively stiff resilient electrically insulating material, and comprising an elongated and relatively narrow back plate having a pressure sensitive adhesive on the rear face thereof for securing the same in facing engagement to a supporting surface without prior attachment of fasteners either to the supporting surface or the wire support, a resilient clip member extending outwardly from one longitudinal edge of the back plate and of a length along its connection with the said longitudinal edge of the back plate substantially less than the over-all length of the back plate to leave spaced portions of the front face of the back plate exposed to serve as pressure applying areas in applying the wire support to the supporting surface, said clip members being bent to a predetermined position to extend across and substantially coextensive with the width of the front face of the back plate and spaced outwardly therefrom, the resilient clip member serving as an additional pressure applying area over a subjacent unexposed portion of the back plate in applying the wire support to a supporting surface by transmitting applied pressure to the back plate through the edge of the clip member connected to the back plate and through the free edge of the clip member depressed into contact with the subjacent portion of the back plate without permanent deformation of the clip member which inherently springs back to its normal predetermined position for snugly receiving a wire to be subsequently applied thereto or by transmitting the applied pressure to the back plate through a wire previously disposed between the back plate and clip member.

2. A wire support as claimed in claim 1, wherein the resilient clip member is disposed intermediate the opposite ends of the back plate leaving exposed opposite end portions of the back plate as pressure applying areas.

3. A wire support as claimed in claim 1, wherein the clip member has the free edge thereof diverging from said back plate to facilitate application of a wire therebetween.

4. A wire support as claimed in claim 3, wherein the remaining portion of the clip member within the diverging edge portion is arcuate in shape.

5. A wire support as claimed in claim 1, wherein the clip member is substantially arcuate in shape.

References Cited in the file of this patent

UNITED STATES PATENTS

| | | |
|---|---|---|
| 441,838 | Greenfield | Dec. 2, 1890 |
| 1,434,532 | Davala et al. | Nov. 7, 1922 |
| 2,580,231 | Lamm | Dec. 25, 1951 |
| 2,723,815 | Browning | Nov. 15, 1955 |
| 2,885,460 | Borresen | May 5, 1959 |
| 2,894,119 | Stenger | July 7, 1959 |

FOREIGN PATENTS

| | | |
|---|---|---|
| 16,986 | Great Britain | Aug. 22, 1899 |
| 17,683 | Great Britain | Aug. 2, 1907 |
| 332,550 | Great Britain | July 21, 1930 |
| 508,587 | France | Oct. 15, 1920 |
| 1,000,184 | France | Oct. 10, 1951 |
| 893,675 | Germany | Dec. 7, 1953 |